Patented Nov. 3, 1942

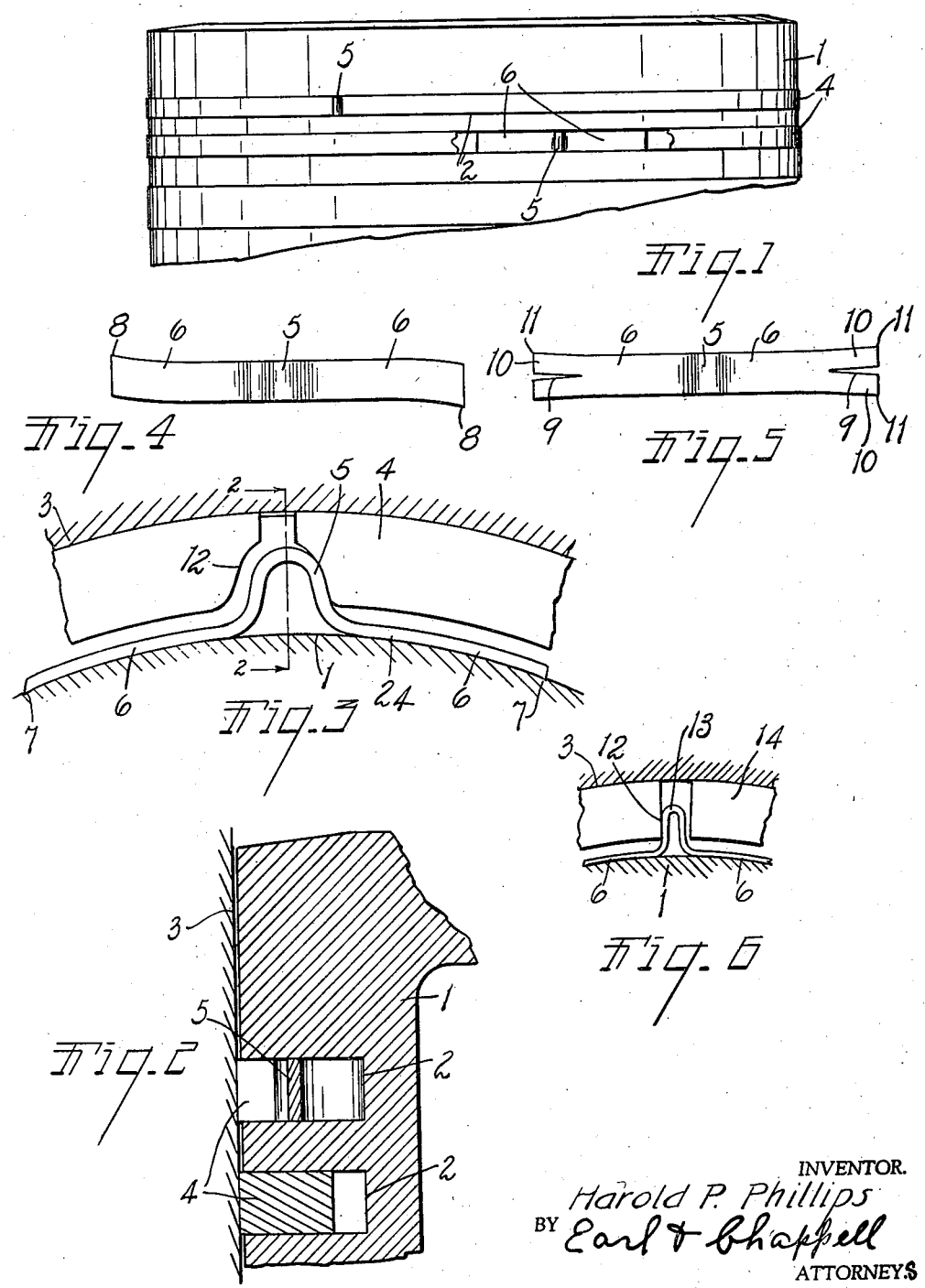

2,300,518

UNITED STATES PATENT OFFICE 2,300,518

ANCHORED PISTON RING ASSEMBLY AND PISTON RING ANCHORING DEVICE

Harold P. Phillips, Hastings, Mich., assignor to Hastings Manufacturing Company, Hastings, Mich., a corporation of Michigan Application March 8, 1940, Serial No. 322,898

9 Claims. (Cl. 309—47)

This invention relates to improvements in anchored piston ring assembly and piston ring anchoring device.

The main object of this invention is to provide a piston ring anchoring member designed to prevent the rotation of a piston ring in the piston ring groove which may be quickly installed without the aid or use of special tools, is economical to produce, and effective for the purpose.

A further object is to provide a device of this character which may be installed in pistons and piston ring assemblies now wide used without special machining or changes in structure.

Objects relating to details and economies of the invention will definitely appear from the description to follow. The invention is defined in the claims.

A device embodying the features of the invention is clearly illustrated in the accompanying drawing, in which:

Fig. 1 is a fragmentary side elevation of a piston ring assembly embodying my invention.

Fig. 2 is a fragmentary vertical section on line 2—2 of Fig. 3.

Fig. 3 is an enlarged fragmentary sectional view illustrating the relation of the parts in an assembly.

Fig. 4 is a plan view of a slightly modified form or embodiment of my invention.

Fig. 5 is a plan view of still another modified form or embodiment of my invention.

Fig. 6 is a fragmentary sectional view corresponding to that of Fig. 3 showing a slight modification in the form of the piston ring engaging lug.

In the accompanying drawing I represents a piston having piston ring grooves 2, 2. 3 represents the cylinder wall. The piston rings 4 are illustrated as of the conventional split expansible type.

My improved ring anchoring member designated generally by the numeral 24 is preferably formed of a strip of spring metal having an offset loop-like bend 5 intermediate its ends constituting a ring stop lug, the portions at each side of this stop lug portion constituting base members 6. These base members are preferably conformed or curved to fit the bottom of the groove and terminate in anchoring teeth 7. These teeth in the embodiment shown in Fig. 3 engage or embed themselves in the bottom of the groove.

In the embodiment shown in Fig. 4 the base members 6 are laterally distorted adjacent their ends providing grooved side wall engaging teeth 8. In the embodiment shown in Fig. 5 the ends of the base members have longitudinal slits 9 formed therein and they are distorted at each side of these slits providing wall engaging anchoring prongs 10 terminating in the teeth 11. In the embodiment of Fig. 3 the stop lug is in the form of an open loop and the ends of the piston ring 4 are milled out at 12 to accommodate the lug. However, in the embodiment of Fig. 6 the loop forming the lug 13 is a substantially closed loop so that it may be disposed in the gap of the piston ring 14 without modification of the piston ring. This form would be especially desirable for use in ring assemblies now on the market.

The anchoring or stop members are formed in widths corresponding to the width of the groove and when positioned in the groove with the teeth in engagement with the walls of the groove, either the side wall or the bottom wall, the device is effectively anchored so that the ring is held against rotation. This is the exclusive function of the device, it being out of radial thrust engagement with the ring and ineffective to control the same save in limiting its circumferential movement.

I am aware that various means have been resorted to for accomplishing this purpose, for instance, pins have been inserted transversely through the grooves or into the bottoms of the grooves to constitute stops, but that requires a machine operation, either when the piston is manufactured or as a repair job. The anchoring lug of my invention wedges into the groove and the teeth or other anchoring members effectively engage the walls so that it remains in position and the ring is effectively anchored against rotation.

I have illustrated and described my invention in embodiments which I consider very practical. I have not attempted to illustrate or describe other adaptations of the invention as it is believed this disclosure will enable those skilled in the art to embody my invention as may be desired.

Having thus described my invention what I claim as new and desire to secure by Letters Patent is:

1. The combination with a piston provided with a piston ring groove and a split piston ring, of a stop member disposed in said groove out of radial thrust engagement with the ring and in circumferential restraining engagement with the split of the piston ring to prevent rotative movement thereof within the groove, said stop member comprising a strip of spring metal of a width approximating the width of the groove and having an intermediate loop-like bend constituting a ring engaging stop lug adapted to be disposed between the ends of the ring, the remaining portions of the stop member constituting base members and being curved to conform to the bottom of the groove and having longitudinal slits in the ends thereof and being spread at the slits providing springable groove wall engaging anchoring prongs.

2. The combination with a piston provided with a piston ring groove and a split piston ring disposed therein, of a stop member disposed in said groove out of radial thrust engagement with said ring and provided with a stop lug engaging in the split of the piston ring, said stop member consisting of a strip of spring material outwardly offset intermediate its ends to provide said split engaging lug, the portions at each side of the lug being of less radial extent than the distance between said ring and the bottom of the groove, said portions being adapted to lie in the bottom of the groove and having distorted end portions wedgingly engaging the groove walls.

3. The combination with a piston provided with a piston ring groove and a split piston ring disposed therein, of a stop member disposed in said groove out of radial thrust engagement with said ring and provided with a stop lug engaging in the split of the piston ring, said stop member consisting of a strip of spring material outwardly offset intermediate its ends to provide said split engaging lug, the portions at each side of the lug being of less radial extent than the distance between said ring and the bottom of the groove, said portions being conformed to provide anchoring teeth.

4. The combination with a piston provided with a piston ring groove and a split piston ring disposed therein, of a stop member disposed in said groove out of radial thrust engagement with said ring and provided with a stop lug engaging in the split of the piston ring and having groove wall engaging anchoring teeth, the radial extent of said member other than at said lug being less than the radial space between said ring and the bottom of the groove to avoid said radial thrust engagement.

5. As an article of manufacture, a stop member adapted to be disposed in a piston ring groove to engage the split of a split piston ring disposed in the groove to prevent rotative movement thereof within the groove, said stop member being disposed out of radial thrust engagement with the ring and comprising a strip of spring metal of a width approximating the width of the groove in which the member is to be installed and having an intermediate loop-like bend constituting a ring engaging stop lug, the portions of the stop member at each side of the lug constituting base portions and being curved to conform to the bottom of the groove and having longitudinal slits in the ends thereof and being spread at the slits providing springable groove wall engaging anchoring prongs.

6. As an article of manufacture, a stop member adapted to be disposed in a piston ring groove to engage the split of a split piston ring disposed in the groove to prevent rotative movement thereof within the groove, said stop member being disposed out of radial thrust engagement with the ring and comprising a strip of metal of a width approximating the width of the groove in which the member is to be installed and having an intermediate loop-like bend constituting a ring engaging stop lug, the portions of the stop member at each side of the lug constituting base portions, being of radial extent less than the radial space between the ring and the bottom of the groove and being provided with groove wall engaging teeth.

7. As an article of manufacture, a stop member adapted to be disposed in a piston ring groove and provided with a stop lug engageable with the split of the piston ring, said stop member being disposed out of radial thrust engagement with the ring and consisting of a strip of material outwardly offset intermediate its ends to provide said split engaging lug, the portions at each side of the lug being conformed to provide base members adapted to rest on the bottom of the groove, said base members being of radial extent less than the radial space between the ring and the bottom of the groove and having distorted end portions providing groove wall engaging anchoring teeth.

8. As an article of manufacture, a stop member adapted to be disposed in a piston ring groove and provided with a stop lug engageable with the split of the piston ring, said stop member being disposed out of radial thrust engagement with the ring and consisting of a strip of material outwardly offset to provide said split engaging lug and being conformed to provide a base having groove wall engaging anchoring teeth, the radial extent of said member other than at said lug being less than the radial space between said ring and the bottom of the groove to avoid said radial thrust engagement.

9. As an article of manufacture, a stop member adapted to be disposed in a piston ring groove and provided with a stop lug engageable with the split of the piston ring, said stop member being disposed out of radial thrust engagement with the ring and consisting of a strip of material conformed to provide said split engaging lug and adapted to rest on the bottom of the groove and having wall engaging anchoring portions, the radial extent of said member other than at said lug being less than the radial space between said ring and the bottom of the groove to avoid said radial thrust engagement.

HAROLD P. PHILLIPS.